Oct. 25, 1960 J. A. C. HYDE 2,957,310
CONVERGENT-DIVERGENT NOZZLE ASSEMBLY
Filed May 11, 1959 2 Sheets-Sheet 1

INVENTOR
J. A. C. HYDE

BY: *Maybee & Legris*
ATTORNEYS

INVENTOR
J. A. C. HYDE

BY: Maybee Legris
ATTORNEYS

United States Patent Office
2,957,310
Patented Oct. 25, 1960

2,957,310

CONVERGENT-DIVERGENT NOZZLE ASSEMBLY

John Alan Courtney Hyde, Littleover, England, assignor to Orenda Engines Limited, Village of Malton, Peel, Ontario, Canada, a corporation Filed May 11, 1959, Ser. No. 812,357

5 Claims. (Cl. 60—35.6)

This invention relates to convergent-divergent nozzle assemblies of the type used on aircraft provided with reaction propulsion power plants such as gas turbine engines or ram jet engines.

The stream of propulsive gases of an aircraft designed for flying at sub-sonic speeds is normally discharged to atmosphere through a plain or variable convergent nozzle. With such a nozzle an increase in pressure ratio across the nozzle will increase the speed of the propulsive jet until the nozzle chokes, i.e. until the velocity of the stream through the nozzle is equal to the local sonic velocity. Further increase in the pressure ratio across the nozzle will not increase the speed of the gas through the nozzle. If, however, the gas stream after leaving the convergent nozzle is allowed to expand in a divergent section then the gas may be caused to attain supersonic velocity. For this reason convergent-divergent nozzle assemblies are used on aircraft designed to travel at supersonic velocities.

However, the divergent section of a convergent-divergent nozzle assembly will only run full at the predetermined pressure ratio for which the nozzle was designed. This optimum nozzle pressure ratio is usually chosen to be that at which the engine is operating at full power with the aircraft travelling at its maximum speed in level flight.

If the pressure ratio across the nozzle assembly be decreased from its optimum, then the gas expanding in the divergent section will not expand sufficiently to fill the section and will break away from the wall of the section since the gas will be over-expanded. Unfortunately the gas does not break cleanly away from the wall of the divergent section and there is a resulting loss of thrust for the following reasons. If the gas flow is over-expanded, then the pressure at the exit plane of the nozzle is less than atmospheric pressure so that, since atmospheric pressure acts on the front of the engine, there will be a drag or thrust loss due to the over-expansion. As will be apparent, this thrust loss is undesirable but, on the other hand, it is desirable to be able to use the convergent-divergent nozzle at pressure ratios other than the optimum at which the divergent section will run full.

The object of the present invention therefore is to provide a convergent-divergent nozzle assembly in which the break away of propulsive gas in the divergent section may be controlled to reduce thrust loss when the nozzle is not operating at its optimum pressure ratio.

It is another object of the present invention to provide a convergent-divergent nozzle assembly in which the divergent section is of fixed mechanical dimensions and wherein the breakaway of the gases in the divergent section is controlled pneumatically.

The invention will now be described by way of example with reference to the accompanying drawings, in which.

Figure 1:
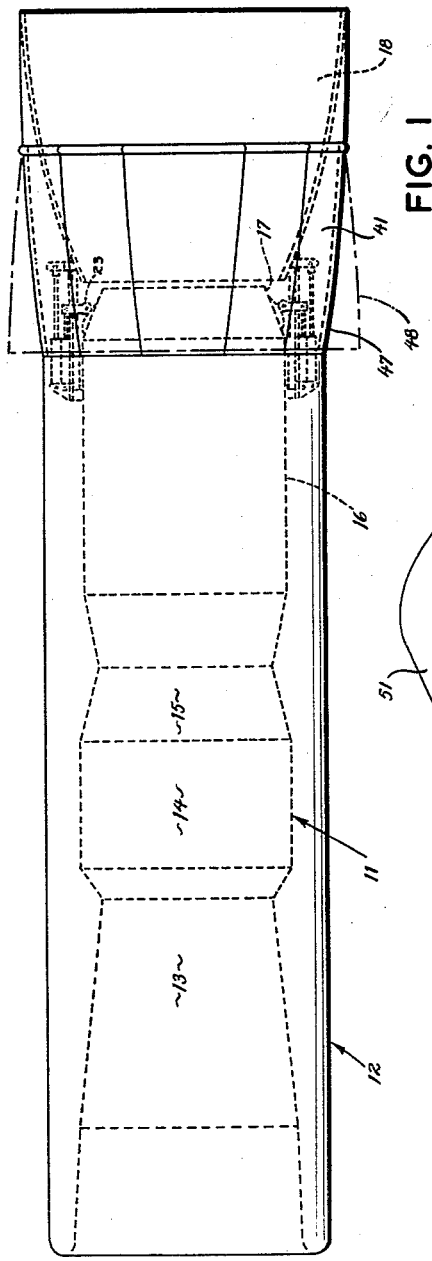
Figure 1 shows in diagrammatic form a gas turbine power plant having a convergent-divergent assembly according to the invention, some parts being omitted for clarity.

Referring now to Figure 1, a gas turbine engine is indicated generally at 11 as mounted in a nacelle indicated generally at 12. The engine 11 includes a compressor portion 13, a combustion chamber portion 14, a turbine portion 15 and a tailpipe 16. The downstream end of the tailpipe terminates in a convergent nozzle 17 which diverges into a fixed divergent duct 18.

Figure 2:
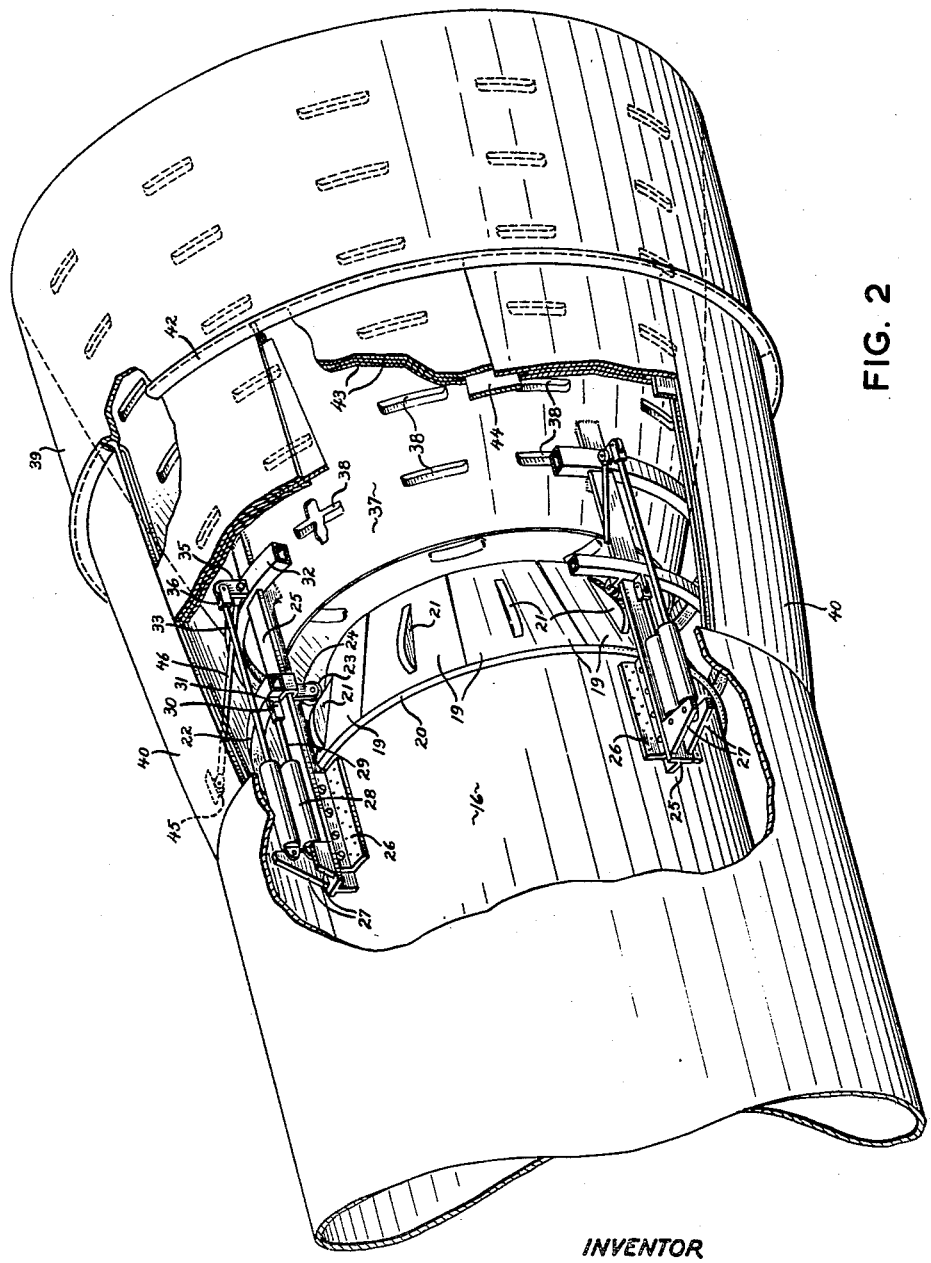
Figure 2 is a perspective view, on a larger scale and partly broken away, showing one embodiment of a convergent-divergent assembly according to the invention.

Referring now to Figure 2, it will be seen that the convergent nozzle 17 is a variable area nozzle and comprises a plurality of longitudinally extending flaps 19 hinged at their upstream ends to a ring 20 at the downstream end of the tailpipe 16. Each of the flaps 19 is provided with an upstanding cam member 21 of convex form. The nozzle is surrounded by a unison ring 22 which carries a plurality of rollers 23 in trunnions 24, each roller 23 co-operating with a cam 21.

The unison ring 22 runs on longitudinally extending guides 25 of which three are provided circumferentially spaced around the tailpipe 16; three of the trunnions 24 embracing the guides to locate the unison ring. The guides 25 are of T-shaped cross section and are secured to the tailpipe by being bolted to angle members 26 which, in turn, are welded to the tailpipe. At the upstream end of each guide member 25 is welded, in parallel, spaced apart relation, a pair of trunnions 27 between which is pivotally mounted one end of a hydraulic actuator 28. The piston rod 29 of the actuator is pivotally attached at 30 to lugs 31 on the unison ring 22. It will be seen that the operation of the actuators 28 will move the piston rods 29 which in turn will move the unison ring 22 along the guides 25. Movement of the unison ring 22 will cause the rollers 23 to coact with the cams 21 to move the flaps 19 and thereby to alter the area of the convergent nozzle.

Also mounted on the guides 25 is a second unison ring 32 which is attached to the piston rod 33 of hydraulic actuators 34 which are pivotally mounted between the trunnions 27. Upstanding lugs 35 are attached to the unison ring 32 and receive forked ends 36 of the piston rods 33. It will be seen that operation of the actuators 34 will move the unison ring 32 axially through the piston rods 33.

The divergent duct 18 has a perforate wall 37 fixed relative to the tailpipe 16 and some of the perforations in the wall being indicated at 38. It will be seen that the perforations are circumferentially arranged in rows or series and that each series is spaced axially of the divergent duct from the other series.

An outer wall section 39 surrounds the perforate wall 37 and is continued forwardly to the downstream end of the nacelle by a plurality of hinged flaps 40. A chamber 41, see Figure 1, is formed between the perforate wall 37 on the one hand and the outer wall section 39 and the flaps 40 on the other hand. The flaps are hinged at their downstream ends in a ring 42 at the upstream end of the outer wall section 39 and extend upstream beyond the throat of the nozzle 17. Each of the flaps 40 is double-walled as indicated at 43 and sealing strips 44 are interposed between the walls 43 of adjacent edges of the flaps in known manner.

Adjacent the upstream end of the inner surface of each flap 40 is provided a lug 45 to which is pivotally attached one end of a link 46, the other ends of the links being pivotally attached to the trunnions 35 on the unison ring 32. It will be seen that movement of the unison ring 32 will open and close the flaps between the positions indicated at 47 and 48 in Figure 1.

The tailpipe 16 comprises a first duct which is defined by an imperforate wall and converges to a throat at the downstream end while the perforate wall 37 defines a second duct and diverges from the throat in a downstream direction to form a gas expansion zone for supersonic gas flow. The chamber 41 is formed between the perforate wall 37 and the wall section 39 and flaps 40 and, as will be described hereinafter, the flaps 40 provide inlet means to admit air into the chamber 41.

The operation of the device described is as follows. When the convergent-divergent nozzle is being operated at its optimum pressure ratio the flaps 40 are retained closed as shown in Figure 2. In this condition no air is admitted to the chamber 41 and the perforations 38 in the wall 37 will have no effect and the assembly will act as a normal convergent-divergent nozzle. So long as the nozzle runs at its optimum pressure ratio the flaps 40 will be retained closed but, when the nozzle pressure ratio decreases, the gas issuing from the convergent nozzle will be over-expanded in the divergent duct 18. As explained above, this over-expansion will provide a drag due to the fact that the pressure at the exit plane of the nozzle will be less than atmospheric pressure. To avoid, or minimise this drag, as the nozzle pressure ratio decreases the unison ring 32 is moved forwardly to open the flaps 40 towards the position shown at 48 in Figure 1. The pressure of the air admitted by the flaps 40 is controlled by the degree of opening of the flaps thereby to control the point of breakaway of the jet passing through the divergent section. The control of the flaps 40 may be directly under the control of the pilot or automatic means may be used to sense the nozzle pressure ratio and to adjust the flaps accordingly.

In the divergent duct 18, the gas pressure drops progressively from the throat of the convergent nozzle to the point of break away while the velocity increases from the throat to the point of break away. Since the gas pressure in the downstream portion of the divergent duct is less than in the upstream portion, secondary air admitted by opening the flaps 40 will pass preferentially through the perforations at the downstream end of the perforate wall 37 rather than through the perforations at the forward end of the perforate wall.

As the air passes through the perforations it will detach the propulsive gas jet from the wall at points where the pressure of the secondary air is greater than the pressure of the jet thus curing over-expansion and pneumatically adjusting the effective exit area of the nozzle. As the pressure in the chamber 41 is increased, by further opening the flaps 40, air will pass through the perforations at increasing velocity until the perforations choke, that is to say until the air passing through the perforations is moving at local sonic velocity. Further increase in pressure of the secondary air will then cause air to pass through perforations nearer the upstream end of the perforate wall and will therefore cause the propulsive gases to break away further upstream.

It will be seen that by varying the opening of the flaps 40 the pressure of the secondary air in the chamber 41 may be varied and that by varying the pressure of the secondary air the position of the break away of the propulsive jet from the walls of the divergent duct can be controlled to give maximum propulsive efficiency, i.e. a setting at which there is the maximum difference in thrust between the jet thrust and the nacelle drag. If the flaps 40 have been opened to cause the propulsive jet to break away too far upstream from the exit plane of the divergent nozzle as the nozzle pressure ratio rises, then the flaps 40 may be partially closed to reduce the pressure in the chamber and thereby move downstream the point at which break away occurs.

The convergent nozzle may either be operated directly by the pilot or by automatic means well known in the art.

Figure 3:
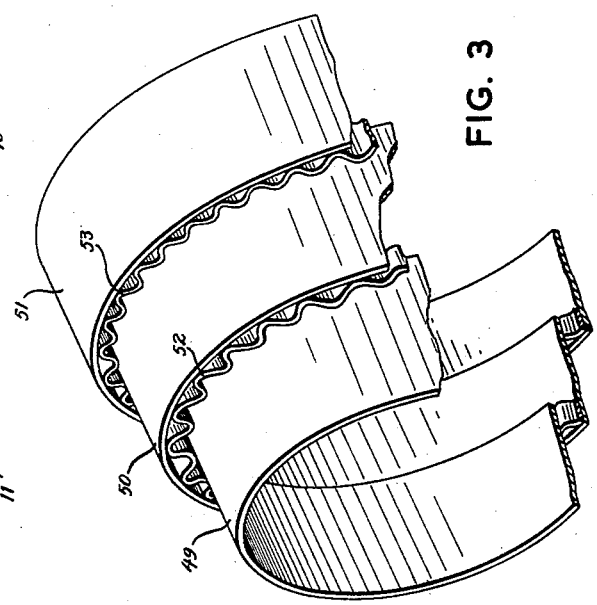
Figure 3 is a detail showing an alternative form of wall for the divergent section of the nozzle.

In Figure 3 is shown an alternative form of divergent duct 18. The duct comprises three imperforate frustoconical portions 49, 50, and 51 arranged so that the upstream edge of the intermediate section 50 overlaps and, is spaced radially from, the downstream edge of the section 49, similarly, the downstream edge of the section 50 overlaps, and is spaced radially from, the upstream edge of the section 51. Corrugated spacers 52 and 53 are welded between the overlapping portions of the wall sections. It will be seen that these three sections with their corrugated spacers provide a duct having a perforate wall by virtue of the spacers 52 and 53. Operation of a nozzle having this alternative type of divergent duct in place of the perforate wall 37 shown in Figure 2 is the same as the operation of the embodiment already described.

It will be seen that the invention provides a simple convergent-divergent assembly in which the point of break away of the jet through the divergent section may be controlled pneumatically. The nozzle has the advantage that the divergent section of the nozzle has no moving parts and this is particularly important with the high temperatures attained by engine exhaust gases when using modern chemical fuels. The extremely high temperatures attained makes the design of mechanically variable divergent nozzles extremely difficult with regard to gas sealing and the nozzle parts have to be of relatively heavy construction to withstand the elevated temperatures attained. A further advantage of the invention is that, compared with mechanically variable divergent nozzles, only low power actuators are required since all the actuators have to do is to move the convergent nozzle flaps 19 and the flaps 40 whereas to move flaps of a mechanically divergent nozzle greater power would be required. The nozzle of the invention is light in weight compared to mechanically variable divergent nozzles and all moving parts of the nozzle, i.e. the actuators, unison rings, piston rods, etc. are in the relatively cool secondary air admitted through the flaps 40.

Furthermore, since the divergent section of the nozzle does not have to be variable in shape it is possible to design it to have an optimum configuration whereas with a mechanically variable nozzle the configuration is usually a compromise between the various factors involved. The lighter weight of the nozzle in the invention enables the nozzle to be longer to improve the propulsive efficiency as compared to mechanically variable nozzles.

It will be understood that the form of the invention herewith shown and described is a preferred example and various modifications can be carried out without departing from the spirit of the invention or the scope of the appended claims:

What I claim as my invention is:

1. A convergent-divergent nozzle assembly for the discharge to atmosphere of a propulsive gas stream and comprising; a first duct having a downstream end, the first duct being defined by an imperforate wall and converging to a throat at said downstream end; a second duct in communication with, and downstream of, the throat, the second duct being defined by a perforate wall fixed relative to the first duct and diverging from the throat in a downstream direction to form a gas expansion zone for supersonic gas flow, the perforations in said fixed perforate wall being arranged in a plurality of series, each series extending generally circumferentially of the second duct and being spaced axially of said second duct from the other series of said plurality; a chamber surrounding the perforate wall and communicating with the second duct through said perforations; inlet means associated with the chamber to admit secondary gas thereto; and actuating means to control the inlet means to vary the pressure of the secondary gas admitted to the chamber.

2. A convergent-divergent nozzle assembly for the discharge to atmosphere of a propulsive gas stream and comprising; a first duct having a downstream end, the first duct being defined by an imperforate wall and converging to a throat at said downstream end; a second duct in communication with, and downstream of, the throat, the second duct being defined by a perforate wall fixed relative to the first duct and diverging from the throat in a downstream direction to form a gas expansion zone for supersonic gas flow, the perforations in said fixed perforate wall being arranged in a plurality of series, each series extending generally circumferentially of the second duct and being spaced axially of said second duct from the other series of said plurality; an outer wall surrounding the perforate wall and defining therewith a chamber, the inner wall of the chamber being provided by said perforate wall and the interior of the chamber being in communication with the interior of the second duct through said perforations; inlet means in the outer wall to admit secondary gas to the chamber; and actuating means to control the inlet means to vary the pressure of the secondary gas admitted to the chamber.

3. A convergent-divergent nozzle assembly for the discharge to atmosphere of a propulsive gas stream and comprising; a first duct having a downstream end, the first duct being defined by an imperforate wall which converges to a throat at said downstream end; a second duct in communication with, and downstream of, the throat, the second duct being defined by a perforate wall fixed relative to the first duct and diverging from the throat in in a downstream direction to form a gas expansion zone for supersonic gas flow, the perforations in said fixed perforate wall being arranged in a plurality of series, each series extending generally circumferentially of the second duct and being spaced axially of said second duct from the other series of said plurality; an outer wall surrounding the perforate wall and defining therewith a chamber, the inner wall of the chamber being provided by said perforate wall and the interior of the chamber being in communication with the interior of the second duct through said perforations; a plurality of flaps hinged at their one ends to the outer wall, the flaps being movable between open and closed positions, in their closed positions the flaps forming a continuation of the outer wall and preventing the flow of secondary gas into the chamber and in their open positions the flaps allowing secondary gas to pass into the chamber; and actuating means to control the positions of the flaps to vary the pressure of the secondary gas admitted to the chamber.

4. A convergent-divergent nozzle assembly for the discharge to atmosphere of a propulsive gas stream and comprising; a first duct having a downstream end, the first duct being defined by an imperforate wall which converges to a throat at said downstream end; a second duct co-axial with the first duct and in communication with, and downstream of, the throat, the second duct being defined by a perforate wall fixed relative to the first duct and diverging from the throat in a downstream direction to form a gas expansion zone for supersonic gas flow, the perforations in said fixed perforate wall being arranged in a plurality of series, each series extending generally circumferentially of the second duct and being spaced axially of said second duct from the other series of said plurality; an annular outer wall surrounding the perforate wall and defining therewith a chamber, the inner wall of the chamber being provided by said perforate wall and the interior of the chamber being in communication with the interior of the second duct through said perforations; an annularly arranged series of longitudinally extending flaps hinged at their downstream ends to the outer wall, the flaps being movable between open and closed positions, in their closed positions the flaps forming a continuation of the outer wall and extending upstream of the throat and preventing the flow of secondary gas into the chamber, and in their open positions the flaps allowing secondary gas to enter the chamber; and actuating means to move the flaps to vary the pressure of the secondary gas admitted to the chamber.

5. A convergent-divergent nozzle assembly for the discharge to atmosphere of a propulsive gas stream and comprising; a first duct having a downstream end and being defined by an imperforate wall, a series of longitudinally extending annularly arranged flaps at the downstream end of the duct, means hinging the upstream ends of the flaps to the downstream end of the duct, means to vary the hinged positions of the flaps to vary the exit area of the duct; a second duct so-axial with the first duct and in communication with and downstream thereof, the second duct being defined by a perforate wall fixed relative to the first duct and diverging from the throat in a downstream direction to form a gas expansion zone for supersonic gas flow, the perforations in said fixed perforate wall being arranged in a plurality of series, each series extending generally circumferentially of the second duct and being spaced axially of said second duct from the other series of said plurality, an outer wall surrounding the perforate wall and defining therewith a chamber, the inner wall of the chamber being provided by said perforate wall and the interior of the chamber being in communication with the interior of the second duct through said perforations, a second plurality of annularly arranged longitudinally extending flaps hinged to the outer wall, the flaps being hinged at their downstream ends and being movable between open and closed positions, in their closed positions the flaps forming a continuation of the outer wall and preventing the flow of secondary gas into the chamber, and in their open positions the flaps allowing secondary gas to pass into the chamber; and actuating means to control the movement of the flaps to vary the pressure of the secondary gas admitted to the chamber.

References Cited in the file of this patent

UNITED STATES PATENTS

| | | |
|---|---|---|
| 1,389,797 | Thompson | Sept. 6, 1921 |
| 2,335,134 | Sands | Nov. 23, 1943 |
| 2,397,998 | Goddard | Apr. 9, 1946 |
| 2,653,445 | Halford et al. | Sept. 29, 1953 |
| 2,770,944 | Jordan | Nov. 20, 1956 |
| 2,811,828 | McLafferty | Nov. 5, 1957 |

FOREIGN PATENTS

| | | |
|---|---|---|
| 654,344 | Great Britain | June 13, 1951 |
| 788,316 | Great Britain | Dec. 23, 1957 |